(12) United States Patent
Cheng et al.

(10) Patent No.: US 12,566,242 B2
(45) Date of Patent: Mar. 3, 2026

(54) RADIO FREQUENCY APPARATUS AND METHOD FOR ASSEMBLING RADIO FREQUENCY APPARATUS

(71) Applicant: Shenzhen Yinwang Intelligent Technologies Co., Ltd., Shenzhen (CN)

(72) Inventors: Zhe Cheng, Xi'an (CN); Daqing Peng, Shanghai (CN); Zhiwei Zhang, Shanghai (CN); Jie Peng, Xi'an (CN); Bin Hu, Shenzhen (CN); Lungang Yun, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/672,557

(22) Filed: Feb. 15, 2022

(65) Prior Publication Data

US 2022/0171018 A1      Jun. 2, 2022

Related U.S. Application Data

(63) Continuation of application No. PCT/CN2020/082373, filed on Mar. 31, 2020.

(30) Foreign Application Priority Data

Aug. 16, 2019    (CN) .......................... 201910759450.1

(51) Int. Cl.
| | |
|---|---|
| *G01S 7/03* | (2006.01) |
| *G01S 13/931* | (2020.01) |
| *H01Q 1/32* | (2006.01) |
| *H01Q 1/42* | (2006.01) |
| *H01Q 17/00* | (2006.01) |

(52) U.S. Cl.
CPC ............ *G01S 7/038* (2013.01); *G01S 13/931* (2013.01); *H01Q 1/3233* (2013.01); *H01Q 1/42* (2013.01); *H01Q 17/00* (2013.01)

(58) Field of Classification Search
None
See application file for complete search history.

(56) References Cited

U.S. PATENT DOCUMENTS

| | | | | |
|---|---|---|---|---|
| 4,038,660 A | * | 7/1977 | Connolly ............. | H01Q 17/004 342/1 |
| 10,074,907 B2 | | 9/2018 | Ding et al. | |
| 2003/0058133 A1 | | 3/2003 | Arnold et al. | |
| 2006/0238404 A1 | | 10/2006 | Ikeda | |
| 2012/0119932 A1 | * | 5/2012 | MacDonald ........... | H01Q 1/425 342/1 |
| 2012/0119969 A1 | | 5/2012 | Macdonald et al. | |

(Continued)

FOREIGN PATENT DOCUMENTS

| | | |
|---|---|---|
| CN | 101005754 A | 7/2007 |
| CN | 102395226 A | 3/2012 |

(Continued)

*Primary Examiner* — Robert W Hodge
*Assistant Examiner* — Brandon James Henson
(74) *Attorney, Agent, or Firm* — Leydig, Voit & Mayer, Ltd.

(57) ABSTRACT

Embodiments provide a radio frequency apparatus including a radome, an absorber, and a radio frequency circuit board that may be used for millimeter wave radar of an intelligent automobile to reduce high-frequency radiation interference from a radio frequency chip and an antenna feeder.

20 Claims, 6 Drawing Sheets

(56)                References Cited

U.S. PATENT DOCUMENTS

2013/0181859 A1      7/2013  Waldschmidt et al.
2017/0003377 A1      1/2017  Menge
2020/0243960 A1*     7/2020  Wittmann ............. H01Q 17/00

FOREIGN PATENT DOCUMENTS

CN          103444278  A      12/2013
CN          104201468  A      12/2014
CN          105143911  A      12/2015
CN          105182296  A      12/2015
CN          105409056  A       3/2016
CN          106169652  A      11/2016
CN          105143911  B   *   5/2018  ........... G01S 13/931
CN          207967308  U      10/2018
CN          208091534  U      11/2018
CN          109228000  A       1/2019
CN          109346841  A   *   2/2019  ......... G01R 29/0878
CN          109804264  A       5/2019
CN          109841946  A       6/2019
DE       102019200912  A1      7/2020
JP         2003287568  A      10/2003
WO         2019091231  A1      5/2019

* cited by examiner

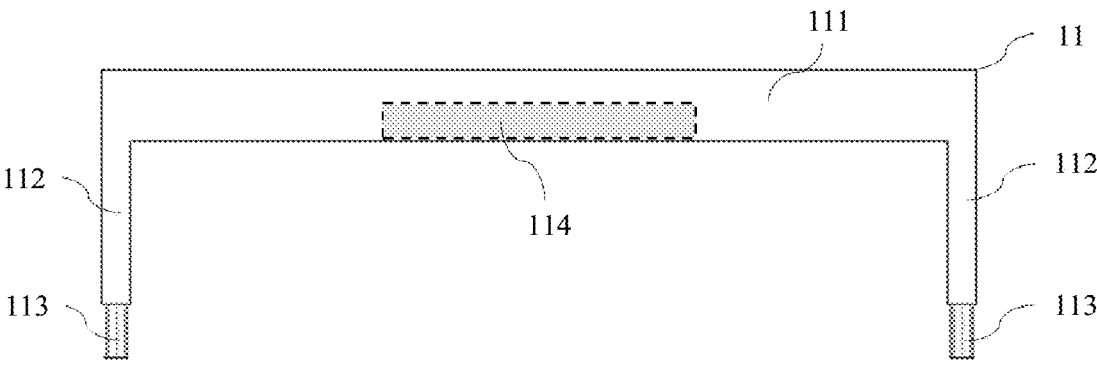

FIG. 11

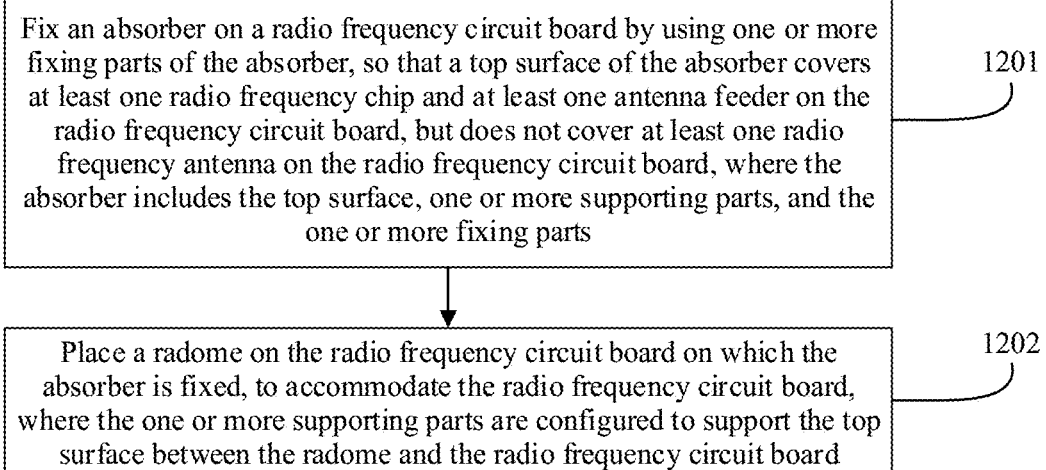

| Fix an absorber on a radio frequency circuit board by using one or more fixing parts of the absorber, so that a top surface of the absorber covers at least one radio frequency chip and at least one antenna feeder on the radio frequency circuit board, but does not cover at least one radio frequency antenna on the radio frequency circuit board, where the absorber includes the top surface, one or more supporting parts, and the one or more fixing parts | 1201 |
| --- | --- |
| Place a radome on the radio frequency circuit board on which the absorber is fixed, to accommodate the radio frequency circuit board, where the one or more supporting parts are configured to support the top surface between the radome and the radio frequency circuit board | 1202 |

FIG. 12

RADIO FREQUENCY APPARATUS AND METHOD FOR ASSEMBLING RADIO FREQUENCY APPARATUS

CROSS-REFERENCE TO RELATED APPLICATIONS

This application is a continuation of International Application No. PCT/CN2020/082373, filed on Mar. 31, 2020, which claims priority to Chinese Patent Application No. 201910759450.1 filed on Aug. 16, 2019. The disclosures of the aforementioned applications are hereby incorporated by reference in their entireties.

TECHNICAL FIELD

The present disclosure relates to radio frequency communications technologies, and in particular, to a radio frequency apparatus capable of absorbing high-frequency interference signals from a radio frequency chip and an antenna feeder, and a method for assembling a radio frequency apparatus.

BACKGROUND

As the main means of transportation in various countries, automobiles are becoming more popular. At the same time, frequent traffic accidents have also aroused people's attention. As an important part of the active safety technology for automobiles, vehicle-mounted radar can predict dangers in a timely manner, thereby improving road traffic safety. A vehicle-mounted radar system can calculate information such as a velocity, an angle, and a distance of a target relative to the vehicle by receiving echoes of transmitted signals. The vehicle-mounted radar system is not interfered by factors such as rain, fog, dust, and night, and features all-weather operation.

In an existing vehicle-mounted radar system, antennas and chips are largely integrated at the top layer of a PCB (printed circuit board). Both a transmitting antenna and a receiving antenna are connected to the chip through a feeder. This brings about the following problems:

1. Radiation of the antenna feeder at the millimeter-wave band has adverse impact on an antenna directivity pattern, which in turn affects measurement quality of the radar system.

2. The chip generates high-frequency interference signals during working, and at the same time receives interference signals from an external source. This may cause interference to signal transmission or reception of the antenna.

3. Isolation between the antenna and each transceiver channel of the chip becomes poor under the interference of high-frequency signals.

Therefore, it is necessary to shield the interference signals generated or received by the antenna feeder and the chip to avoid the impact of the interference signals on the entire radar system. Moreover, in addition to the vehicle-mounted radar, there is also a need to reduce high-frequency radiation from radio frequency chips and antenna feeders in communications devices, sensing devices, and navigation devices that have radio frequency chips and antennas.

FIG. 1 is a schematic diagram of a radio frequency interference signal shielding structure in a radio frequency apparatus in the prior art. As shown in FIG. 1, a radome 101 has good electromagnetic wave penetration characteristics, and accommodates a radio frequency circuit board 102 to protect a radio frequency system including an antenna from an external harsh environment. Both the radome 101 and the radio frequency circuit board 102 are fixed on a base 103. An absorber 104 is installed on the top of an inner side of the radome 101 through gluing or screwing. The absorber 104 absorbs leaked electromagnetic waves, so as to shield high-frequency interference signals from the radio frequency chip 105 and the antenna feeder. However, there are some shortcomings in the manner of integrating the absorber 104 with the radome 101 in FIG. 1. For example, coupling between the absorber and the radome has adverse impact on antenna performance to some extent; the open absorber has poor effect of shielding radiation of microstrips, and has poor effect of improving isolation between ports; when subjected to vibration, impact, and the like, the absorber may fall off, causing failure of the radar system to work normally.

FIG. 2 is a schematic diagram of a radio frequency interference signal shielding structure in another radio frequency apparatus in the prior art. As shown in FIG. 2, a radome 201 has good electromagnetic wave penetration characteristics and accommodates a radio frequency circuit board 202 to protect a radio frequency system including an antenna from an external harsh environment. Both the radome 201 and the radio frequency circuit board 202 are fixed on a base 203. A metal shielding cover 204 is integrated on the radio frequency circuit board 202 through welding or the like, and shields a radio frequency chip 205. Because the metal shielding cover 204 cannot completely shield radiation of a microstrip transmission line, this solution further uses a manner of converting a microstrip feeder into an SIW (substrate integrated waveguide) feeder. However, there are also some shortcomings in the manner of using the metal shielding cover 204 for isolation in FIG. 2. For example, material and assembly costs are relatively high, and there is a risk of cavity resonance inside the metal shielding cover. This solution uses the SIW feeder instead of a conventional microstrip transmission line, increasing design difficulty and costs.

SUMMARY

To reduce high-frequency radiation interference of a radio frequency chip and an antenna feeder, and to resolve the foregoing problems in the prior art, embodiments of the present disclosure provide a radio frequency apparatus and a method for assembling a radio frequency apparatus.

According to a first aspect, a radio frequency (RF) apparatus is provided, including a radome, an absorber, and a radio frequency circuit board. The radome is configured to accommodate the radio frequency (RF) circuit board. The absorber includes a top surface, one or more supporting pieces, and one or more securing pieces. The radio frequency circuit board includes at least one radio frequency (RF) chip, at least one antenna feeder, and at least one radio frequency (RF) antenna. The top surface covers at least one RF chip and at least one antenna feeder while leaving at least one RF antenna uncovered. The one or more securing pieces are configured to secure the absorber on the RF circuit board. Each supporting piece is configured to position the absorber top surface between the radome and the radio frequency circuit board. The absorber can absorb a high-frequency interference signal of the radio frequency chip when the radio frequency apparatus is working, and at the same time prevent an external interference signal from entering the RF chip. In addition, because the absorber also covers the antenna feeder part, a high-frequency interference signal radiated by the antenna feeder is also absorbed by the absorber, thereby preventing the radiation of the antenna feeder from affecting an antenna array and improving isolation between ports of the radio frequency chip. In comparison with the prior art shown in FIG. 1, integrating the absorber with the radio frequency circuit board instead of integrating the absorber with the radome can eliminate impact of coupling between the absorber and the radome on an antenna radiation directivity pattern. In comparison with the prior art shown in FIG. 2, the absorber can shield both the antenna feeder and the radio frequency chip without requiring an additional SIW transmission line, thereby reducing process complexity and processing costs and further avoiding a risk of resonance.

According to the first aspect, in a first possible implementation of the radio frequency apparatus, a thickness of the top surface is 0.2 to 0.75 air wavelength, and the air wavelength is a wavelength of a radio frequency electromagnetic wave having a center frequency of an absorption frequency band of the absorber when transmitted in the air medium.

According to the first aspect or the first possible implementation of the first aspect, in a second possible implementation of the radio frequency apparatus, a distance between the top surface and the radome is less than 0.5 air wavelength, the air wavelength being the wavelength of the radio frequency electromagnetic wave having the center frequency of the absorption frequency band of the absorber when transmitted in the air medium.

According to the first aspect or any one of the foregoing implementations of the first aspect, in a third possible implementation of the radio frequency apparatus, a distance between the top surface and the radio frequency circuit board is less than 0.5 air wavelength, and the air wavelength is the wavelength of the radio frequency electromagnetic wave having the center frequency of the absorption frequency band of the absorber when transmitted in the air medium. The thickness of the top surface of the absorber, the distance between the top surface and the radome, and the distance between the top surface and the radio frequency circuit board can be optimized and set to achieve a better shielding effect.

According to the first aspect or any one of the foregoing implementations of the first aspect, in a fourth possible implementation of the radio frequency apparatus, the absorber is integrally formed and made of a wave-absorbing material. The processing technique of integrated formation can reduce processing costs while simplifying subsequent installation operations so that installation and disassembly can be completed quickly.

According to the first aspect or any one of the foregoing implementations of the first aspect, in a fifth possible implementation of the radio frequency apparatus, the wave-absorbing material is formed by mixing a high-frequency absorbent, a coupling agent, and a thermoplastic resin substrate.

According to the first aspect or any one of the foregoing implementations of the first aspect, in a sixth possible implementation of the radio frequency apparatus, the absorber top surface includes at least one RF chip cavity configured to accommodate a protrusion formed by at least one RF chip on the RF circuit board. Because an ordinary RF chip has a specific protrusion height on the RF circuit board, the top surface is provided with a RF chip cavity for accommodating the protrusion so that the distance between the top surface and the RF circuit board can be set more easily, and absorption of high-frequency interference radiation by the absorber can be improved.

According to the first aspect or any one of the foregoing implementations of the first aspect, in a seventh possible implementation of the radio frequency apparatus, the securing piece is a scrivet, the scrivet includes an elastic part configured to pass through a through hole corresponding to the scrivet on the radio frequency circuit board. The absorber can be simply and conveniently installed on the radio frequency circuit board through the scrivet, and installation is relatively secure.

According to the first aspect or any one of the foregoing implementations of the first aspect, in an eighth possible implementation of the radio frequency apparatus, the securing piece is a fixing pin that is configured to be inserted into a through hole corresponding to the fixing pin on the radio frequency circuit board. Each of the securing pieces or supporting pieces is adhesively bonded to the radio frequency circuit board. The fixing pin is also a simply and conveniently installed structure.

According to the first aspect or any one of the foregoing implementations of the first aspect, in a ninth possible implementation of the radio frequency apparatus, the radio frequency apparatus further includes a base configured to secure the RF circuit board and the radome. Based on different application scenarios of the radio frequency apparatus, the base adaptively has different configurations, or the base may not be needed in some application scenarios.

According to the first aspect or any one of the foregoing implementations of the first aspect, in a tenth possible implementation of the radio frequency apparatus, the radio frequency apparatus is used for millimeter-wave radar. In addition, the radio frequency apparatus may also be used for a communications device, a sensing device, or a navigation device that has a radio frequency chip and an antenna. Application scenarios of the radio frequency apparatus include but are not limited to a vehicle-mounted collision avoidance radar system, an adaptive cruise control system, dead spot monitoring, intelligent driving assistance, and unmanned driving.

According to a second aspect, a method for assembling a radio frequency apparatus is provided. The method includes securing an absorber on a radio frequency circuit board by using one or more securing pieces so that a top surface of the absorber covers at least one radio frequency chip and at least one antenna feeder on the radio frequency circuit board, but does not cover at least one radio frequency antenna on the radio frequency circuit board. The absorber includes the top surface, one or more supporting pieces, and the one or more securing pieces. A radome is positioned on the radio frequency circuit board on which the absorber is secured so as to accommodate the radio frequency circuit board. One or more supporting pieces are configured to position the top surface between the radome and the RF circuit board. The absorber is configured to absorb a high-frequency interference signal of the RF chip when the radio frequency apparatus is in operation and at the same time prevent external interference signal from entering the RF chip.

In addition, because the absorber also covers the antenna feeder, a high-frequency interference signal radiated by the antenna feeder is also absorbed by the absorber, thereby preventing the radiation of the antenna feeder from affecting an antenna array and improving isolation between ports of the radio frequency chip. In comparison with the prior art shown in FIG. 1, integrating the absorber with the radio frequency circuit board as opposed to integrating the absorber with the radome can eliminate impact of coupling between the absorber and the radome on an antenna radiation directivity pattern. In comparison with the prior art shown in FIG. 2, the absorber of this second aspect is configured to shield both the antenna feeder and the radio frequency chip without requiring an additional SIW transmission line, thereby reducing process complexity and processing costs and further avoiding a risk of resonance.

According to the second aspect, in a first possible implementation of the method for assembling a radio frequency apparatus, a distance between the top surface and the radome is less than 0.5 air wavelength, where the air wavelength is a wavelength of a radio frequency electromagnetic wave having a center frequency of an absorption frequency band of the absorber when transmitted in the air medium.

According to the second aspect or the first possible implementation of the second aspect, in a second possible implementation of the method for assembling a radio frequency apparatus, a distance between the top surface and the radio frequency circuit board is less than 0.5 air wavelength, and the air wavelength is the wavelength of the radio frequency electromagnetic wave having the center frequency of the absorption frequency band of the absorber when transmitted in the air medium. The distance between the top surface of the absorber and the radome, and the distance between the top surface and the radio frequency circuit board can be optimized and set to achieve a better shielding effect.

According to the second aspect or any one of the foregoing implementations of the second aspect, in a third possible implementation of the method for assembling a radio frequency apparatus, the absorber covers at least one radio frequency chip on the radio frequency circuit board. At least one radio frequency chip cavity is positioned on the top surface and accommodates a protrusion formed by the at least one radio frequency chip on the radio frequency circuit board. Because an ordinary radio frequency chip has a specific protrusion height on the radio frequency circuit board, the top surface is provided with a radio frequency chip cavity for accommodating the protrusion so that the distance between the top surface and the radio frequency circuit board can be set more easily, and an effect of absorbing high-frequency interference radiation by the absorber can be improved.

According to the second aspect or any one of the foregoing implementations of the second aspect, in a fourth possible implementation of the method for assembling a radio frequency apparatus, securing the absorber on a radio frequency circuit board includes passing the elastic part of the scrivet on the absorber through the through hole corresponding to the scrivet on the radio frequency circuit board. The absorber can be simply and conveniently installed on the radio frequency circuit board through the scrivet to achieve a secure installation.

According to the second aspect or any one of the foregoing implementations of the second aspect, in a fifth possible implementation of the method for assembling a radio frequency apparatus, the step of securing an absorber on a radio frequency circuit board by using one or more securing pieces of the absorber includes inserting a fixing pin on the absorber into a through hole corresponding to the fixing pin on the radio frequency circuit board, and gluing the one or more securing pieces or the one or more supporting pieces to the radio frequency circuit board. The fixing pin is also a simply and conveniently installed structure.

According to the second aspect or any one of the foregoing implementations of the second aspect, in a sixth possible implementation of the method for assembling a radio frequency apparatus, the method further includes installing and securing the radio frequency circuit board and the radome on the base. Based on different application scenarios of the radio frequency apparatus, the base has different existence forms, or the base may not be needed in some application scenarios.

According to a third aspect, a radar system is provided including the radio frequency apparatus according to the first aspect or any one of the foregoing implementations of the first aspect.

According to a fourth aspect, a vehicle is provided including the radar system according to the third aspect.

BRIEF DESCRIPTION OF DRAWINGS

FIG. 11 is a side sectional view of an absorber in a radio frequency apparatus according to a fourth embodiment of the present disclosure; and FIG. 12 is a flowchart of a method for assembling a radio frequency apparatus according to a fifth embodiment of the present disclosure.

DESCRIPTION OF EMBODIMENTS

To make the objectives, technical solutions, and advantages of the embodiments of the present disclosure more clear, the following clearly describes the technical solutions in the embodiments of the present disclosure with reference to the accompanying drawings, it being understood that the described embodiments are merely exemplary of but not all of the embodiments. All other embodiments obtained by a person of ordinary skill in the art without creative efforts shall fall within the scope of the accompanying claims.

The first embodiment is a case in which the radio frequency apparatus is applied to a vehicle-mounted millimeter-wave radar. When the vehicle-mounted millimeter-wave radar is in operation, the radio frequency chip, the transmitting antenna, and the receiving antenna each externally radiate high-frequency electromagnetic signals. Coupling of various signals causes high-frequency signal interference. If the high-frequency interference signals are not shielded, measurement precision of the radar system is severely affected. In the first embodiment, the absorber installed on the radio frequency circuit board is configured to absorb these high-frequency interference signals and attenuate most of the high-frequency interference signals by at least 10 dB, ensuring normal working of the radar system.

Figure 3:
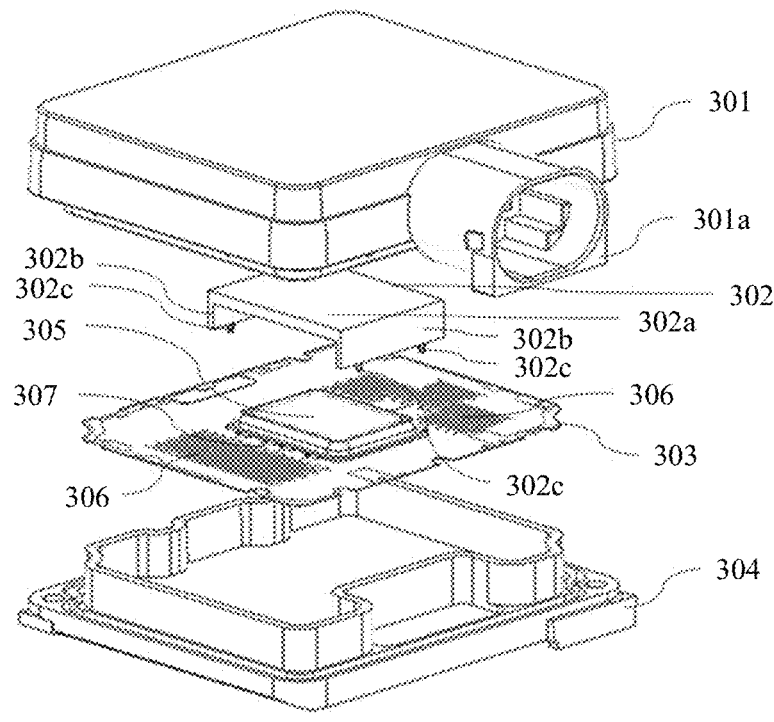
FIG. 3 is an exploded view of a radio frequency apparatus according to a first embodiment of the present disclosure.

As shown in the exploded view of the radio frequency apparatus in FIG. 3, the radio frequency apparatus includes a radome 301, an absorber 302, a radio frequency circuit board 303, and a base 304. The radome 301 has good electromagnetic wave penetration characteristics and accommodates a radio frequency circuit board 303 to protect a radio frequency system including an antenna from an external harsh environment. The radome 301 includes a protruding structure 301a for accommodating various lines connected to the radio frequency apparatus. Both the radome 301 and the radio frequency circuit board 303 are secured (fixed) to the base 304. The absorber includes a top surface 302a, one or more supporting pieces 302b, and one or more securing (fixing) pieces 302c, which can be in the form of protrusions or legs extending beyond the supporting pieces 302b. The absorber 302 is fixed on the radio frequency circuit board 303 through the one or more securing pieces 302c, and is placed between the radome 301 and the radio frequency circuit board 303 through the one or more supporting pieces 302b. The absorber 302 is kept at a proper distance from each of the radome 301 and the radio frequency circuit board 303. The radio frequency circuit 303 board has a first side and a second side. The radio frequency chip 305 and an antenna array 306 are located on the first side, the digital part is located on the second side, and the top surface 302a of the absorber is located above the first side of the radio frequency circuit board 303. Specifically, the top surface 302a of the absorber is located directly above the radio frequency chip 305 and an antenna feeder 307 on the radio frequency circuit board 303, and can cover the radio frequency chip 305 and the antenna feeder 307, but does not cover the radio frequency antenna 306, that is, there is no absorber 302 directly above the radio frequency antenna 306. Otherwise, the radio frequency apparatus cannot transmit or receive radio frequency signals properly. In this embodiment, "cover" includes two possible cases: contact and non-contact. On one radio frequency circuit board, there may be more than one radio frequency chip, antenna feeder, and radio frequency antenna, and there are various manners of laying out these three components. Therefore, based on a specific layout of the radio frequency circuit board, the top surface of the absorber may have a plurality of configurations in accordance with the layout. The base 304 is configured to install and secure the radio frequency circuit board 303 and the radome 301. Based on different application scenarios of the radio frequency apparatus, the base 304 has different configurations, or the radio frequency apparatus does not include the base in some application scenarios. In a specific application, the radio frequency apparatus may be installed on the roof, the rear or the body side of a vehicle based on different detection objects and detection ranges of the millimeter-wave radar, and sizes and shapes of the base and the radome can also be adjusted adaptively to achieve effects of secure mounting (firmness) and aesthetics.

Figure 4:
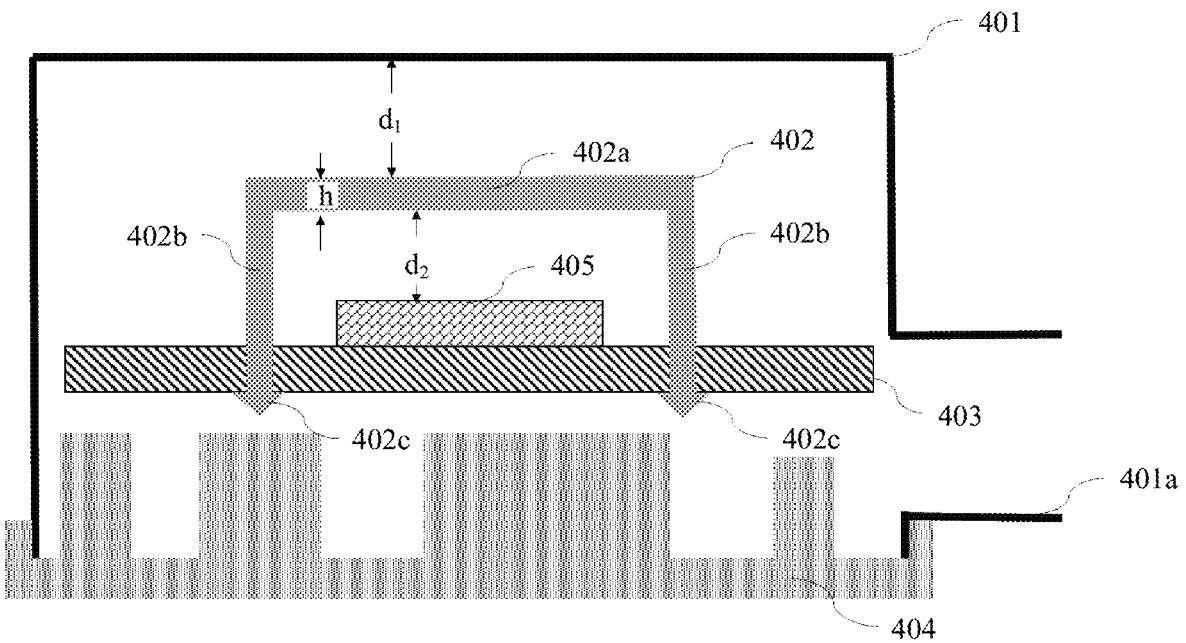
FIG. 4 is a side sectional view of a radio frequency apparatus according to a first embodiment of the present disclosure.
Figure 5:
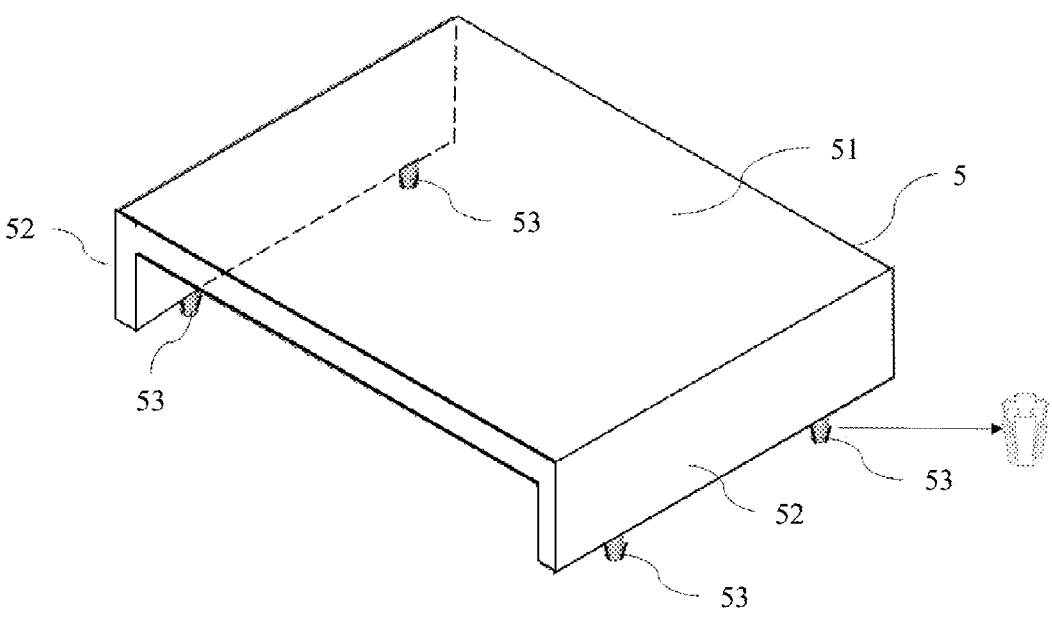
FIG. 5 is a perspective view of an absorber in a radio frequency apparatus according to a first embodiment of the present disclosure.

FIG. 4 is a schematic side sectional view of a radio frequency apparatus according to a first embodiment. The radio frequency apparatus in the figure includes a radome 401, an absorber 402, a radio frequency circuit board 403, and a base 404. The radome 401 includes a protruding structure 401a for accommodating various lines connected to the radio frequency apparatus. The absorber 402 includes a top surface 402a, one or more supporting pieces 402b, and one or more securing pieces 402c that can be in the form of legs or extensions from the supporting pieces, as shown. The radio frequency circuit board 403 includes a radio frequency chip 405. FIG. 5 is a perspective view of an absorber in a radio frequency apparatus according to a first embodiment. In the figure, an absorber 5 includes a top surface 51, one or more supporting pieces 52, and one or more securing (fixing) pieces 53. It can be seen that the absorber in the first embodiment includes a top surface, two supporting pieces, and four securing pieces. The absorber as a whole is integrally formed through injection molding of a wave-absorbing material. For example, a thermoplastic resin is used as a substrate, and a high-frequency (20 GHz or higher frequency) absorbent and a coupling agent are uniformly mixed with the thermoplastic resin substrate to form wave-absorbing particles. Then, a mold is used to perform injection molding on the wave-absorbing particles for integrated formation, which can be used to absorb high-frequency (20 GHz or higher frequency) electromagnetic waves of a specific frequency.

In the first embodiment, a thickness h of the top surface of the absorber is 0.2 to 0.75 air wavelength, a distance $d_1$ between the top surface and the radome is less than 0.5 air wavelength, and a distance $d_2$ between the top surface and the radio frequency circuit board is less than 0.5 air wavelength. The air wavelength is a wavelength of a radio frequency electromagnetic wave having a center frequency of an absorption frequency band of the absorber when transmitted in the air medium. The thickness and the distance are set to ensure that the absorber can efficiently absorb high-frequency interference signals from radio frequency chips and antenna feeders.

With continuing reference to FIG. 5, in the first embodiment, the supporting pieces 52 are two cuboid structures, which are respectively integrally formed on two opposite sides of the top surface, and two integrally formed scrivets 53 are provided under each cuboid. The scrivet serves as a securing piece of the absorber to secure the absorber on the radio frequency circuit board. Each scrivet includes one elastic (spring) element. Four scrivets are pressed so that the spring elements pass through the through holes corresponding to the scrivets on the radio frequency circuit board, the spring element rebounding upon passing through the through hole to engage a lower surface of the circuit board, as shown in FIG. 4 at 402c. In this way, the absorber is secured to the radio frequency circuit board. The installation operation is very simple and convenient. A person skilled in the art can easily design other specific forms of the supporting piece and the fixing piece that are different from the first embodiment, which all fall within the protection scope of the present disclosure.

Figure 1:
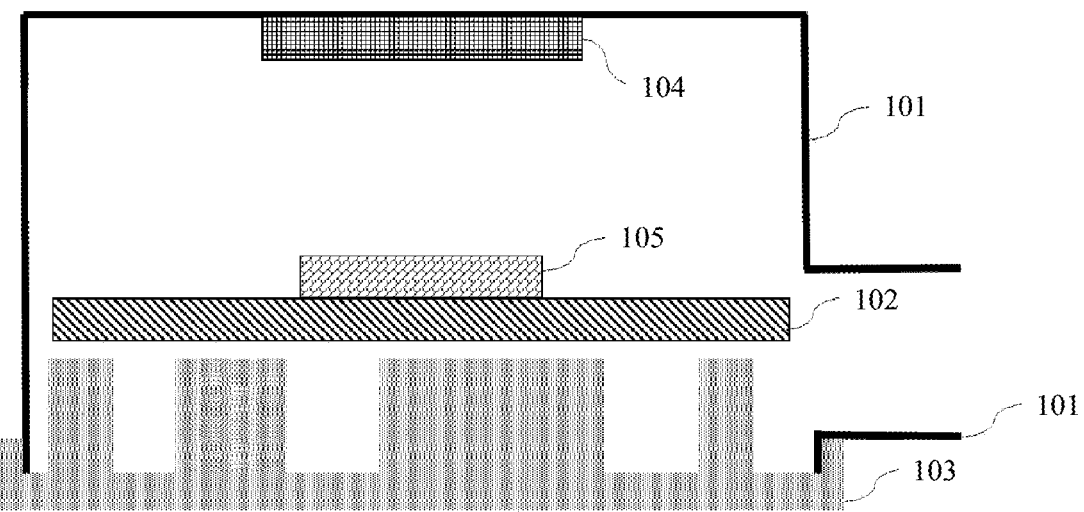
FIG. 1 is a side sectional view of a radio frequency interference signal shielding structure in a radio frequency apparatus in the prior art.
Figure 2:
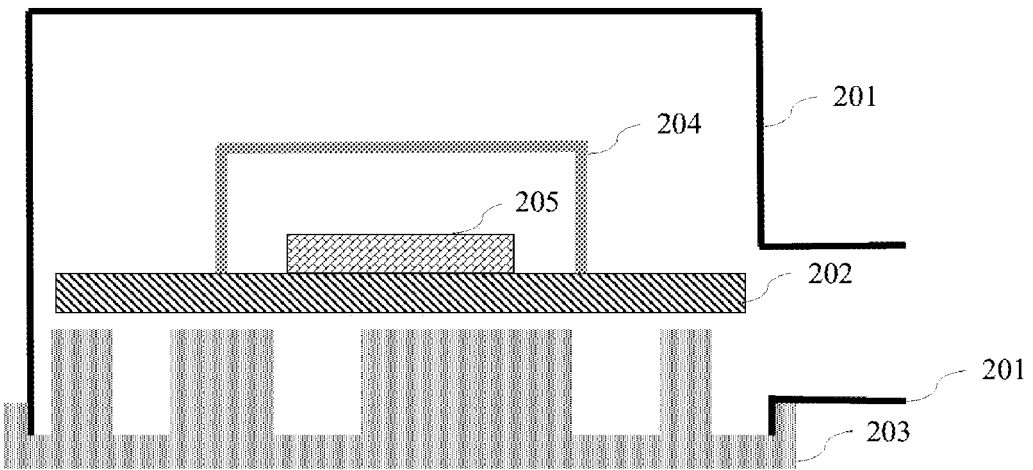
FIG. 2 is a side sectional view of a radio frequency interference signal shielding structure in another radio frequency apparatus in the prior art.

In the first embodiment, the absorber can absorb a high-frequency interference signal of the radio frequency chip when the millimeter-wave radar is working, and at the same time prevent an external interference signal from entering the radio frequency chip. In addition, because the absorber also covers the antenna feeder part, a high-frequency interference signal radiated by the antenna feeder is also absorbed by the absorber, thereby preventing the radiation of the antenna feeder from adversely affecting an antenna array and improving isolation between ports of the radio frequency chip. The absorber can be simply and conveniently installed on the radio frequency circuit board with corresponding through holes using the scrivet. A wave-absorbing capability of an absorbing structure can attenuate most high-frequency interference signals by at least 10 dB, so as to achieve a shielding effect. In comparison with the prior art in FIG. 1, the first embodiment integrates the absorber with the radio frequency circuit board instead of integrating the absorber with the radome, thereby eliminating impact of coupling between the absorber and the radome on an antenna radiation directivity pattern. In comparison with the prior art in FIG. 2, the first embodiment uses the shielding method in which the absorber replaces the metal shielding cover, so that both the antenna feeder and the radio frequency chip can be shielded without requiring an additional substrate integrated waveguide (SIW) transmission line, thereby reducing processing complexity and avoiding a risk of resonance of the metal shielding cover.

Although the first embodiment is a case applied to a vehicle-mounted millimeter-wave radar, the present disclosure can also be applied to other devices that include radio frequency chips and antennas, such as a communications device, a sensing device, or a navigation device. Application scenarios include but are not limited to a vehicle-mounted collision avoidance radar system, an adaptive cruise control system, dead spot monitoring, intelligent driving assistance, and unmanned driving.

Figure 6:
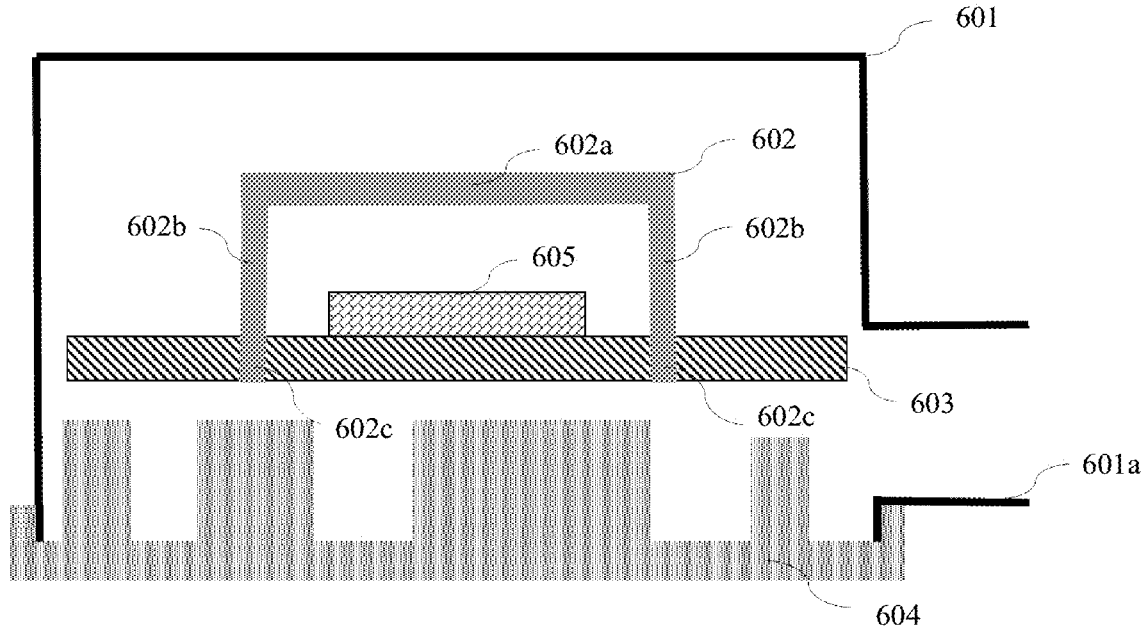
FIG. 6 is a side sectional view of a radio frequency apparatus according to a second embodiment of the present disclosure.
Figure 7:
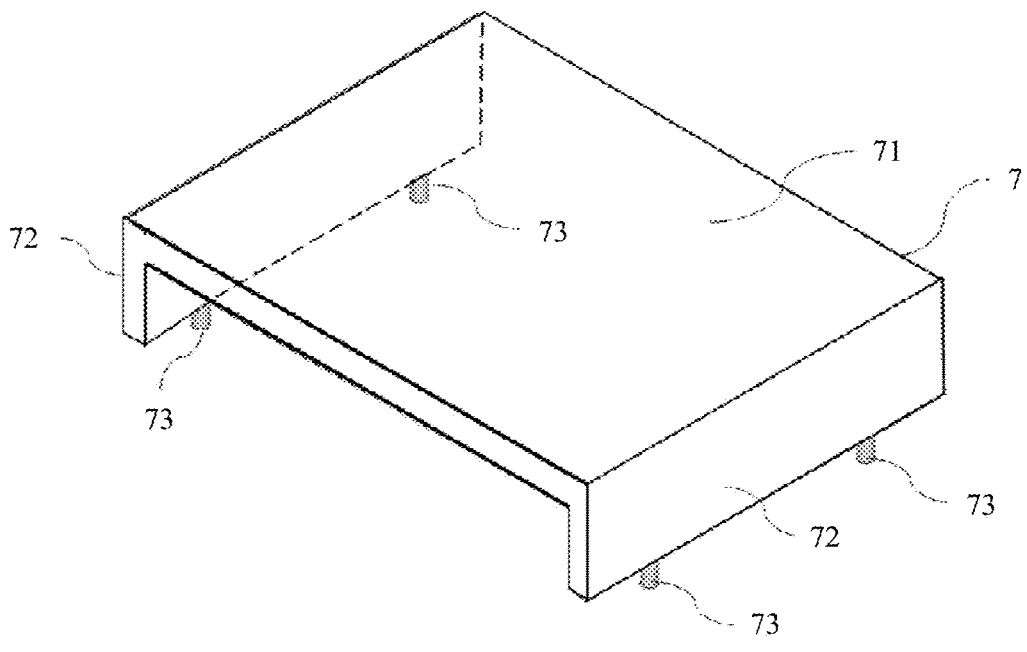
FIG. 7 is a perspective view of an absorber in a radio frequency apparatus according to a second embodiment of the present disclosure.

A second embodiment provides a radio frequency apparatus. FIG. 6 is a schematic side sectional view of a radio frequency apparatus according to a second embodiment. The radio frequency apparatus in the figure includes a radome 601, an absorber 602, a radio frequency circuit board 603, and a base 604. The radome 601 includes a protruding structure 601a for accommodating various lines connected to the radio frequency apparatus. The absorber 602 includes a top surface 602a, one or more supporting pieces 602b, and one or more fixing pieces 602c. The radio frequency circuit board 603 includes a radio frequency chip 605. FIG. 7 is a perspective view of an absorber in a radio frequency apparatus according to a second embodiment. In the figure, an absorber 7 includes a top surface 71, one or more supporting pieces 72, and one or more securing pieces 73. A difference between the second embodiment and the first embodiment is that in the second embodiment, the scrivet serving as a securing piece is replaced with a securing pin. The securing pin is also integrally formed with other parts of the absorber and inserted into a through hole corresponding to the fixing pin on the radio frequency circuit board to be adhesively bonded to the radio frequency circuit board. The adhesive bonding may bond the securing piece to the radio frequency circuit board (for example, glue is applied to the securing pin), or bonding the supporting piece to the radio frequency circuit board (for example, glue is applied to a bottom surface of the supporting piece, which is in contact with the radio frequency circuit board). As with the first embodiment, the second embodiment can also achieve the technical effect of reducing the high-frequency radiation interference from the radio frequency chip and the antenna feeder, and can also overcome many deficiencies in the prior art.

Figure 8:
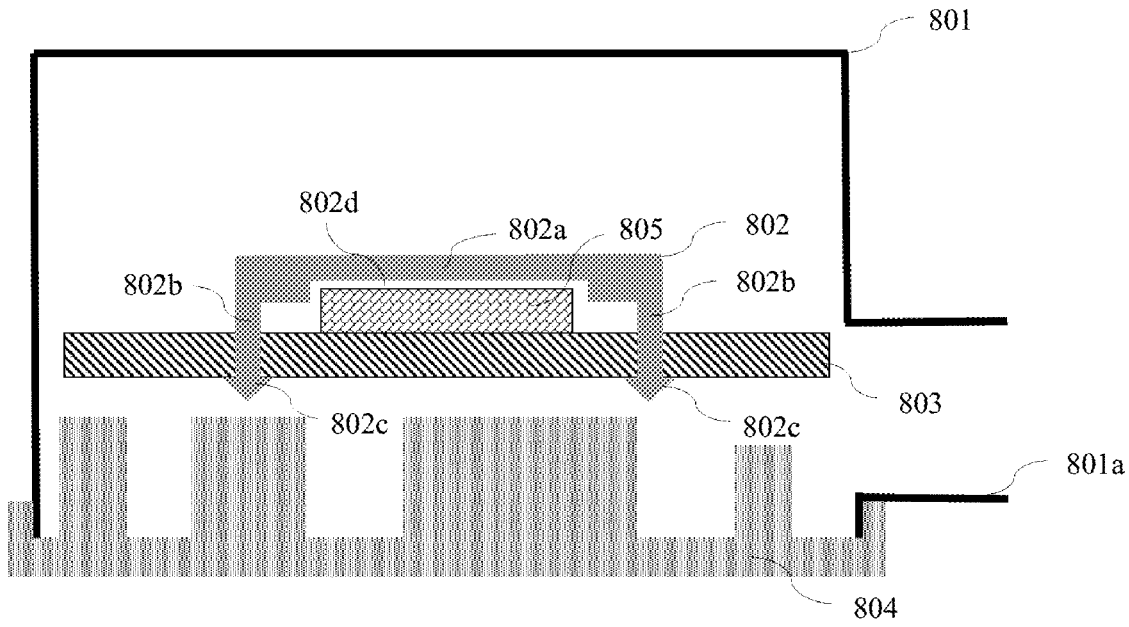
FIG. 8 is a side sectional view of a radio frequency apparatus according to a third embodiment of the present disclosure.
Figure 9:
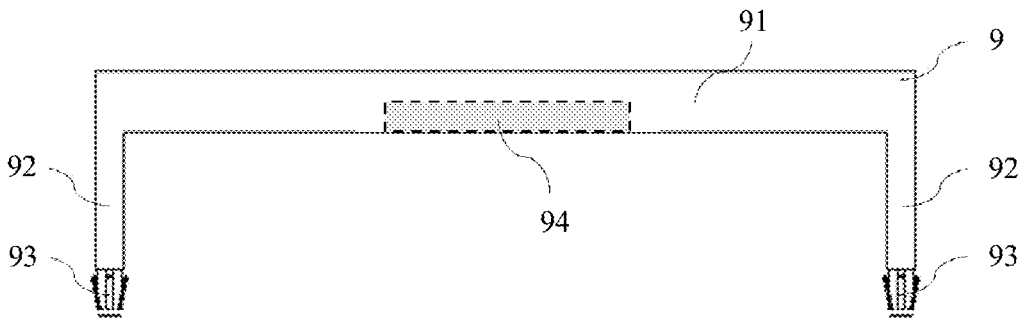
FIG. 9 is a side sectional view of an absorber in a radio frequency apparatus according to a third embodiment of the present disclosure.

A third embodiment provides a radio frequency apparatus. FIG. 8 is a side sectional view of a radio frequency apparatus according to a third embodiment. The radio frequency apparatus in the figure includes a radome 801, an absorber 802, a radio frequency circuit board 803, and a base 804. The radome 801 includes a protruding structure 801a for accommodating various lines connected to the radio frequency apparatus. The absorber 802 includes a top surface 802a, one or more supporting pieces 802b, and one or more securing pieces 802c. The radio frequency circuit board 803 includes a radio frequency chip 805. FIG. 9 is a sectional side sectional view of an absorber in a radio frequency apparatus according to a third embodiment. In the figure, an absorber 9 includes a top surface 91, one or more supporting pieces 92, and one or more securing pieces 93. The third embodiment is different from the first embodiment in that the top surface 802a in FIG. 8 of the third embodiment further includes at least one radio frequency chip cavity 802d, and the top surface 91 in FIG. 9 further includes at least one radio frequency chip cavity 94. The at least one radio frequency chip cavity is configured to accommodate a protrusion formed by the at least one radio frequency chip on the radio frequency circuit board. Because an ordinary radio frequency chip has a specific protrusion height on the radio frequency circuit board, the top surface is provided with a radio frequency chip cavity for accommodating the protrusion, so that the distance between the top surface and the radio frequency circuit board can be set more easily, and an effect of absorbing high-frequency interference radiation by the absorber is improved.

Figure 10:
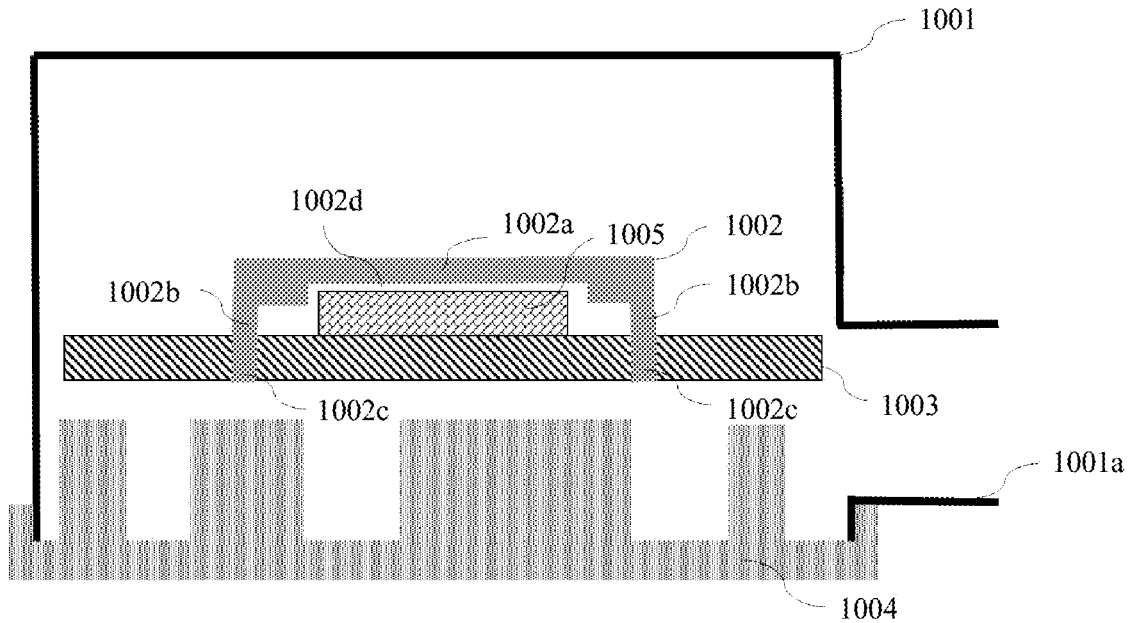
FIG. 10 is a side sectional view of a radio frequency apparatus according to a fourth embodiment of the present disclosure.

A fourth embodiment of a radio frequency apparatus is depicted in FIG. 10. The radio frequency apparatus in the figure includes a radome 1001, an absorber 1002, a radio frequency circuit board 1003 and a base 1004. The radome 1001 includes a protruding structure 1001a for accommodating various lines connected to the radio frequency apparatus. The absorber 1002 includes a top surface 1002a, one or more supporting pieces 1002b, and one or more fixing pieces 1002c. The radio frequency circuit board 1003 includes a radio frequency chip 1005. FIG. 11 depicts an absorber in a radio frequency apparatus according to a fourth embodiment. In the figure, an absorber 11 includes a top surface 111, one or more supporting pieces 112, and one or more securing pieces 113. The fourth embodiment is different from the second embodiment in that the top surface 1002a in FIG. 10 of the fourth embodiment further includes at least one radio frequency chip cavity 1002d, and the top surface 111 in FIG. 11 further includes at least one radio frequency chip cavity 114. The at least one radio frequency chip cavity is configured to accommodate a protrusion formed by the at least one radio frequency chip on the radio frequency circuit board. Because an ordinary radio frequency chip has a specific protrusion height on the radio frequency circuit board, the top surface is adaptively provided with a radio frequency chip cavity for accommodating the protrusion, so that the distance between the top surface and the radio frequency circuit board can be set more easily, and an effect of absorbing high-frequency interference radiation by the absorber is improved.

A fifth embodiment of the present disclosure provides a method for assembling a radio frequency apparatus, as shown in FIG. 12, including:

Step 1201: Secure an absorber on a radio frequency circuit board by using one or more securing pieces of the absorber so that a top surface of the absorber covers at least one radio frequency chip and at least one antenna feeder on the radio frequency circuit board, but does not cover at least one radio frequency antenna on the radio frequency circuit board. The absorber includes the top surface, one or more supporting pieces, and the one or more securing pieces.

Step 1202: Place a radome on the radio frequency circuit board on which the absorber is secured, to accommodate the radio frequency circuit board, where the one or more supporting pieces are configured to support the top surface between the radome and the radio frequency circuit board.

In this embodiment, "cover" includes two possible cases: contact and non-contact. The absorber can absorb a high-frequency interference signal of the radio frequency chip when the radio frequency apparatus is in operation, and at the same time prevent an external interference signal from entering the radio frequency chip. In addition, because the absorber also covers the antenna feeder part, a high-frequency interference signal radiated by the antenna feeder is also absorbed by the absorber, thereby preventing the radiation of the antenna feeder from affecting an antenna array, and improving isolation between ports of the radio frequency chip. In comparison with the prior art shown in FIG. 1, integrating the absorber with the radio frequency circuit board instead of integrating the absorber with the radome can eliminate impact of coupling between the absorber and the radome on an antenna radiation directivity pattern. In comparison with the prior art shown in FIG. 2, the absorber can shield both the antenna feeder and the radio frequency chip without requiring an additional SIW transmission line, thereby reducing process complexity and processing costs, and further avoiding a risk of resonance.

Further, the distance between the top surface of the absorber and the radome, and the distance between the top surface and the radio frequency circuit board are optimized and set to achieve a better shielding effect. In the fifth embodiment, the distance between the top surface and the radome is set to be less than 0.5 air wavelength, the distance between the top surface and the radio frequency circuit board is set to be less than 0.5 air wavelength, and the air wavelength is a wavelength of a radio frequency electromagnetic wave having a center frequency of an absorption frequency band of the absorber when transmitted in the air medium.

Further, in the fifth embodiment, that the absorber covers at least one radio frequency chip on the radio frequency circuit board includes: at least one radio frequency chip cavity located on the top surface accommodates a protrusion formed by the at least one radio frequency chip on the radio frequency circuit board. Because an ordinary radio frequency chip has a specific protrusion height on the radio frequency circuit board, the top surface is adaptively provided with a radio frequency chip cavity for accommodating the protrusion, so that the distance between the top surface and the radio frequency circuit board can be set more easily, and an effect of absorbing high-frequency interference radiation by the absorber is improved.

Further, in the fifth embodiment, securing an absorber to a radio frequency circuit board by using one or more securing pieces of the absorber includes: passing the elastic part on the scrivet on the absorber through the through hole corresponding to the scrivet on the radio frequency circuit board. The absorber can be simply and conveniently installed on the radio frequency circuit board by the scrivet to provide a secure installation.

As an alternative to the scrivet, the securing pin on the absorber may be inserted into the through hole corresponding to the securing pin on the radio frequency circuit board, and the one or more securing pieces or the one or more supporting pieces may be adhesively bonded to the radio frequency circuit board so as to secure the absorber to the radio frequency circuit board. The securing pin is also a simply and conveniently installed structure, but it is more difficult to disassemble if using the securing pin than the scrivet.

Further, in the fifth embodiment, the method includes installing and securing the radio frequency circuit board and the radome to the base. Based on different application scenarios of the radio frequency apparatus, the base adaptively has different configurations, or the base may not be needed in some application scenarios.

On the basis of the radio frequency apparatuses shown in the first to the fourth embodiments, a fifth embodiment of a radar system is further provided. The radar system includes the radio frequency apparatus according to any one of the implementations in the first to the fourth embodiments.

On the basis of the radio frequency apparatuses shown in the first to the fourth embodiments, a sixth embodiment of a radar system is further provided. The vehicle includes the radio frequency apparatus according to any one of the implementations in the first to the fourth embodiments.

The foregoing embodiments can be applied to vehicles as well as to a communications device, a sensing device, a navigation device, or another device that includes a radio frequency chip and an antenna. Application scenarios include, but are not limited to, a vehicle-mounted collision avoidance radar system, an adaptive cruise control system, dead spot monitoring, intelligent driving assistance, and unmanned driving.

A person skilled in the art may clearly understand that the descriptions of the embodiments provided in this disclosure may be mutually referenced. For ease and brevity of description, for example, for functions of the apparatuses and devices and performed steps that are provided in the embodiments of this disclosure refer to related descriptions in the method embodiments of this disclosure. Reference can also be made between various method embodiments and between various apparatus embodiments.

In the embodiments described herein, it should be understood that the disclosed apparatus and method may be implemented in other manners without departing from the scope of this disclosure. For example, the described embodiment is merely an example, the module or unit division is merely logical function division, and there may be another division manner in actual implementation. A plurality of units or components may be combined or integrated into another system, or some features may be ignored or not performed.

In addition, the described apparatus and method, and schematic diagrams of different embodiments can be combined or integrated with other systems, modules, technologies, or methods without departing from the scope of this disclosure. In addition, the displayed or discussed mutual couplings or direct couplings or communication connections may be implemented by using various interfaces. The indirect couplings or communication connections between the apparatuses or units may be implemented in electronic, mechanical, or other forms.

The foregoing descriptions are merely specific implementations of this disclosure, but are not intended to limit the protection scope of this disclosure. Any variation or replacement readily determined by a person skilled in the art within the technical scope disclosed of this disclosure shall fall within the protection scope of the claims.

What is claimed is:

1. A radio frequency apparatus, comprising:
a radome;
an absorber comprising a top surface, one or more supporting pieces, and one or more securing pieces; and
a radio frequency (RF) circuit board comprising at least one RF chip, at least one antenna feeder, and at least one RF antenna array, wherein the at least one antenna feeder connects the at least one RF chip to the at least one radio frequency antenna;
the radome being configured to accommodate the RF circuit board, the top surface of the absorber covering the at least one RF chip and covering the at least one antenna feeder so as to electromagnetically shield the at least one RF chip and the at least one antenna feeder, the at least one RF antenna array arranged beyond the top surface of the absorber so as to be uncovered and electromagnetically unshielded by the top surface of the absorber, the at least one RF antenna array being electromagnetically shielded from interference from the at least one RF chip and the at least one antenna feeder, and the one or more securing pieces being configured to secure the absorber to the RF circuit board and to position the top surface of the absorber between the radome and the RF circuit board.

2. The radio frequency apparatus according to claim 1, wherein a thickness of the top surface of the absorber is 0.2 to 0.75 air wavelength, the air wavelength being a wavelength of a radio frequency electromagnetic wave, the radio frequency electromagnetic wave having a frequency corresponding to a center frequency of an absorption frequency band of the absorber when the radio frequency electromagnetic wave is transmitted in an air medium.

3. The radio frequency apparatus according to claim 1, wherein a distance between the top surface of the absorber and the radome is less than 0.5 air wavelength, the air wavelength being a wavelength of a radio frequency electromagnetic wave, the radio frequency electromagnetic wave having a frequency corresponding to a center frequency of an absorption frequency band of the absorber when the radio frequency electromagnetic wave is transmitted in an air medium.

4. The radio frequency apparatus according to claim 1, wherein a distance between the top surface of the absorber and the RF circuit board is less than 0.5 air wavelength, the air wavelength being a wavelength of a radio frequency electromagnetic wave, the radio frequency electromagnetic wave having a frequency corresponding to a center frequency of an absorption frequency band of the absorber when the radio frequency electromagnetic wave is transmitted in an air medium.

5. The radio frequency apparatus according to claim 1, wherein the absorber is integrally formed and is made of a wave-absorbing material.

6. The radio frequency apparatus according to claim 5, wherein the wave-absorbing material is a mixture of a high-frequency absorbent, a coupling agent, and a thermoplastic resin substrate.

7. The radio frequency apparatus according to claim 1, wherein the top surface of the absorber comprising at least one radio frequency chip cavity configured to accommodate a protrusion formed by the at least one RF chip on the RF circuit board.

8. The radio frequency apparatus according to claim 1, wherein the one or more securing pieces comprise a scrivet that includes an elastic part configured to pass through a through-hole formed in the RF circuit board corresponding to the scrivet.

9. The radio frequency apparatus according to claim 1, wherein the one or more securing pieces comprise a fixing pin configured to be inserted into a through-hole corresponding to the fixing pin on the RF circuit board, the one or more securing pieces or the one or more supporting pieces being adhesively bonded to the RF circuit board.

10. The radio frequency apparatus according to claim 1, further comprising a base configured to receive and secure the RF circuit board and the radome.

11. A radar system, comprising:
a radio frequency (RF) apparatus comprising a radome, an absorber, and a RF circuit board;

the absorber comprising a top surface, one or more supporting pieces, and one or more securing pieces;
the RF circuit board comprising at least one RF chip, at least one antenna feeder, and at least one RF antenna array, wherein the at least one antenna feeder connects the at least one RF chip to the at least one radio frequency antenna; and
the radome being configured to accommodate the RF circuit board, the top surface of the absorber covering the at least one RF chip and covering the at least one antenna feeder so as to electromagnetically shield the at least one RF chip and the at least one antenna feeder, the at least one RF antenna array arranged beyond the top surface of the absorber so as to be uncovered by the top surface of the absorber and electromagnetically unshielded by the top surface of the absorber, the at least one RF antenna array being electromagnetically shielded from interference from the at least one RF chip and the at least one antenna feeder, and the one or more securing pieces being configured to secure the absorber to the RF circuit board and to position the top surface of the absorber between the radome and the RF circuit board.

12. The radar system according to claim 11, wherein a thickness of the top surface of the absorber is 0.2 to 0.75 air wavelength, the air wavelength being a wavelength of a radio frequency electromagnetic wave, the radio frequency electromagnetic wave having a frequency corresponding to a center frequency of an absorption frequency band of the absorber when the radio frequency electromagnetic wave is transmitted in an air medium.

13. The radar system according to claim 11, wherein a distance between the top surface of the absorber and the radome is less than 0.5 air wavelength, the air wavelength being a wavelength of a radio frequency electromagnetic wave, the radio frequency electromagnetic wave having a frequency corresponding to a center frequency of a absorption frequency band of the absorber when the radio frequency electromagnetic wave is transmitted in an air medium.

14. The radar system according to claim 11, wherein a distance between the top surface of the absorber and the radio frequency circuit board is less than 0.5 air wavelength, the air wavelength being a wavelength of a radio frequency electromagnetic wave, the radio frequency electromagnetic wave having a frequency corresponding to a center frequency of an absorption frequency band of the absorber when the radio frequency electromagnetic wave is transmitted in an air medium.

15. The radar system according to claim 11, wherein the absorber is integrally formed and is made of a wave-absorbing material.

16. The radar system according to claim 15, wherein the wave-absorbing material is a mixture of a high-frequency absorbent, a coupling agent, and a thermoplastic resin substrate.

17. The radar system according to claim 11, wherein the top surface of the absorber comprises at least one radio frequency chip cavity configured to accommodate a protrusion formed by the at least one RF chip.

18. The radar system according to claim 11, wherein the one or more securing pieces comprise a scrivet that includes an elastic part configured to pass through a through-hole formed in the RF circuit board corresponding to the scrivet.

19. A vehicle, comprising:

a radar system, comprising: a radio frequency (RF) apparatus comprising a radome, an absorber, and a RF circuit board;

the absorber comprising a top surface, one or more supporting pieces, and one or more securing pieces;

the RF circuit board comprising at least one RF chip, at least one antenna feeder, and at least one RF antenna array, wherein the at least one antenna feeder connects the at least one RF chip to the at least one radio frequency antenna; and the radome being configured to accommodate the RF circuit board, the top surface of the absorber covering the at least one RF chip and covering the at least one antenna feeder so as to electromagnetically shield the at least one RF chip and the at least one antenna feeder, the at least one RF antenna array arranged beyond the top surface of the absorber so as to be uncovered and electromagnetically unshielded by the top surface of the absorber, the at least one RF antenna array being electromagnetically shielded from interference from the at least one RF chip and the at least one antenna feeder, and the one or more securing pieces being configured to secure the absorber to the RF circuit board and to position the top surface of the absorber between the radome and the RF circuit board.

20. The radio frequency apparatus according to claim 1, wherein the at least one antenna feeder connects a transmitting RF antenna of the at least one RF antenna array to the at least one RF chip and connects a receiving RF antenna of the at least one RF antenna array to the at least one RF chip; and wherein the transmitting RF antenna and the receiving RF antenna are arranged beyond the top surface of the absorber so as to be uncovered and electromagnetically unshielded by the top surface of the absorber.

* * * * *